United States Patent [19]

Powell

[11] Patent Number: 5,203,179

[45] Date of Patent: Apr. 20, 1993

[54] CONTROL SYSTEM FOR AN AIR CONDITIONING/REFRIGERATION SYSTEM

[75] Inventor: James W. Powell, Guilford, Conn.

[73] Assignee: Ecoair Corporation, New Haven, Conn.

[21] Appl. No.: 845,675

[22] Filed: Mar. 4, 1992

[51] Int. Cl.$^5$ .............................. F25B 41/00
[52] U.S. Cl. ................................ 62/180; 62/216; 62/225; 62/228.4
[58] Field of Search ............... 62/180, 186, 209, 210, 62/212, 224, 225, 226, 227, 228.4, 216

[56] References Cited

U.S. PATENT DOCUMENTS

| | | | |
|---|---|---|---|
| 3,495,418 | 2/1970 | Kapich | 62/227 |
| 3,668,883 | 6/1972 | Ruff et al. | 62/158 |
| 4,151,725 | 5/1979 | Kountz et al. | 62/182 |
| 4,283,920 | 8/1981 | Kainuma et al. | 62/126 |
| 4,362,030 | 12/1982 | Voorhis | 62/510 |
| 4,407,139 | 10/1983 | Ide et al. | 62/215 |
| 4,514,991 | 5/1985 | Zinsmeyer | 62/209 |
| 4,527,399 | 7/1985 | Lord | 62/212 |
| 4,535,607 | 8/1985 | Mount | 62/201 |
| 4,538,422 | 9/1985 | Mount et al. | 62/201 |
| 4,546,618 | 10/1985 | Kountz et al. | 62/201 |
| 4,566,289 | 1/1986 | Iizuka et al. | 62/228 |
| 4,571,951 | 2/1986 | Szymaszek | 62/212 |
| 4,582,124 | 4/1986 | Yoshimi et al. | 165/28 |
| 4,603,556 | 8/1986 | Suefuji et al. | 62/160 |
| 4,616,483 | 10/1986 | Leonard | 62/115 |
| 4,646,532 | 3/1987 | Nose | 62/225 X |
| 4,646,535 | 3/1987 | Matsuoka et al. | 62/228.5 |
| 4,660,387 | 4/1987 | Usami | 62/225 X |
| 4,662,185 | 5/1987 | Kobayashi et al. | 62/228.4 |
| 4,667,480 | 5/1987 | Bessler | 62/180 |
| 4,679,404 | 7/1987 | Alsenz | 62/175 |
| 4,689,967 | 9/1987 | Han et al. | 62/201 |
| 4,689,968 | 9/1987 | McCulloch et al. | 62/225 |
| 4,715,190 | 12/1987 | Han et al. | 62/201 |
| 4,722,196 | 2/1988 | Ishikawa | 62/209 |
| 4,734,628 | 3/1988 | Bench et al. | 318/309 |
| 4,738,118 | 4/1988 | Kanazawa | 62/215 |
| 4,745,767 | 5/1988 | Ohya et al. | 62/211 |
| 4,753,083 | 6/1988 | Sato | 62/209 |
| 4,765,150 | 8/1988 | Persem | 62/215 |
| 4,794,762 | 1/1989 | Orth et al. | 62/203 |
| 4,798,057 | 1/1989 | Okamoto et al. | 62/228.3 |
| 4,821,527 | 4/1989 | Suzuki et al. | 62/209 |
| 4,856,286 | 8/1989 | Sulfstede et al. | 62/89 |
| 4,858,676 | 8/1989 | Bolfik et al. | 165/2 |
| 4,870,833 | 10/1989 | Matsuda et al. | 62/134 |
| 4,877,081 | 10/1989 | Ohtsu | 165/30 |
| 4,914,924 | 4/1990 | Takahashi | 62/133 |
| 4,930,320 | 6/1990 | Ide et al. | 62/184 |
| 4,938,029 | 7/1990 | Shaw | 62/117 |
| 5,065,590 | 11/1991 | Powell et al. | 62/175 |
| 5,157,934 | 10/1992 | Uchida | 62/212 |

FOREIGN PATENT DOCUMENTS

| | | | |
|---|---|---|---|
| 0222164 | 9/1989 | Japan | 62/225 |
| 2109522 | 6/1983 | United Kingdom | 62/225 |

*Primary Examiner*—Harry B. Tanner
*Attorney, Agent, or Firm*—Delio & Peterson

[57] ABSTRACT

A microprocessor-based air conditioning/refrigeration control system adapted for use with a variable speed compressor measures acceleration of the compressor and the temperature or pressure of the refrigerant exiting therefrom, determines the rate of change of the temperature or pressure of the refrigerant, and decreases acceleration of the compressor if the rate of change of the temperature or pressure of the working fluid indicates surging of the compressor. Superheat of the refrigerant is maintained at a first predefined level while the compressor is operating at constant speed and is increased to a second, higher predefined level while the compressor is accelerating. The system is able to diagnose deterioration of the compressor by measuring and comparing power input to the compressor and rate of change of temperature or pressure of the refrigerant at the compressor between initial and subsequent periods, and differentiate between deterioration of a drive component or a pressurizing component of the compressor.

4 Claims, 3 Drawing Sheets

Fig. 3

CONTROL SYSTEM FOR AN AIR CONDITIONING/REFRIGERATION SYSTEM

BACKGROUND OF THE INVENTION

This invention relates generally to control systems for air conditioning/refrigeration systems.

Recent international legislation engendered by environmental concerns over the issues of global warming and ozone depletion have mandated the elimination of freons including those used in the multi-billion dollar air conditioning/refrigeration industry. Substitute refrigerants that have more beneficial environmental indices such as R134A (a replacement for R12 which is widely used in the automotive industry) have been proposed for use in conventional air conditioning/refrigeration systems but at the cost of incurring significant input power penalties, loss of capacity for given component size, and other problems such as lubricant incompatibility.

Most present air conditioning and refrigeration devices, especially those of small capacity typical of home and automotive air conditioners, use positive displacement compressor devices of relatively low pressure ratio (e.g. 4/1). These devices, which typically run at constant speed, pressure charge an accumulator or storage device with high pressure refrigerant for subsequent expansion (and cooling) in the evaporator heat exchanger. These systems cycle on and off to maintain the accumulator storage tank pressure. As the cooling load decreases and less refrigerant flow is required, the on-off cycle time becomes larger. Among the deficiencies with this approach are the fact that the energy efficiency during startup is significantly less than that of steady state running, the frequent cycling during all operating conditions can have deleterious impact on reliability, the variation of cooling with demand is considerable due to the charging and discharging of the accumulator, and, in fact, the load variation which can be accommodated with this type of operation is somewhat limited.

Subsequent improvements on this type of operation can be found in more modern systems which modulate compressor and, in some cases, evaporator and condenser fan speeds to obtain more nearly uniform operation and somewhat improved cycle turn down range and efficiency. These systems typically employed fixed or variable displacement piston, scroll, or wobble plate compressors, numerous examples of which can be found in the literature.

Recent technologies have been disclosed which use refrigerants with much higher specific volumes than the conventional R12 and R22 fluids. These systems, which are well suited to the utilization of small, high speed centrifugal compressors, require higher pressure ratios but much lower absolute pressures than normally encountered. U.S. Pat. No. 5,065,590 describes one such system. Typically, modulated systems such as the one mentioned in this patent control load change and variation of ambient conditions through hot gas bypass (highly inefficient) or through variation of compressor speed with compressor bypass (limited range of maximum to minimum load, again with less than optimum efficiency). However, these schemes and others not specifically described herein all are limited in their operation efficacy and performance optimization, both in power consumption and in range of operations, by the fact that all rely on the utilization of preprogrammed inputs (look-up tables) relating, not only to compressor mechanical constraints, manufacturing tolerances, mechanical condition, operational characteristics, and limiting parameters, but also to refrigerant fluid thermodynamic and aerodynamic parameters.

Given the problems and deficiencies of the prior art, it is therefore an object of the present invention to provide an air conditioning/refrigeration system that is able to use an environmentally safe refrigerant without the losses in efficiency expected of prior art systems.

It is another object of the present invention to provide an air conditioning/refrigeration control system that provides high efficiency over the entire load range.

It is yet another object of the present invention to provide an air conditioning/refrigeration control system adapted to use a compressor, for example, a single stage centrifugal compressor, a two stage centrifugal compressor, an axial/centrifugal compressor, or a mixed flow combination compressor, that can be modulated through a speed range for mid- to high-load ranges and can cycle on and off for mid- to low-load ranges.

It is a further object of the present invention to provide a control system for an air conditioning/ refrigeration system that enables surge-free operation during steady state and during load changes.

It is another object of the present invention to provide an air conditioning/refrigeration control system that minimizes compressor acceleration time from stop to full load.

It is yet another object of the present invention to provide an air conditioning/refrigeration system that has the ability to use other refrigerants in the same system.

It is a further object of the present invention to provide a control system for an air conditioning/ refrigeration system that includes an intrinsic diagnostic capability to detect deteriorated and/or damaged components.

It is yet another object of the present invention to provide an air conditioning/refrigeration control system that maximizes cycle efficiency through control of degree of superheat during steady state and transient operation.

SUMMARY OF THE INVENTION

The above and other objects, which will be apparent to those skilled in the art, are achieved in the various aspects of the present invention which is adapted to use an environmentally safe refrigerant with a variable speed centrifugal or other type compressor. The invention provides a unique control scheme to maximize efficiency over the full load range of the air conditioning/refrigeration system to recover efficiency which otherwise would be lost in conversion to environmentally acceptable working fluids.

The new air conditioning/refrigeration control system described herein is adapted to utilize environmentally safe refrigerants having higher specific volumes, higher pressure ratios, and lower absolute pressures than more conventional refrigerant systems. The low absolute pressures permit fabrication of key components from composite materials. The control system is preferably employed in an air conditioning/refrigeration system which consists of: 1) an electrically driven, hermetically sealed variable speed compressor that can have a single centrifugal stage, two centrifugal stages, combined axial/centrifugal stages, or a mixed flow compressor; 2) an induction, permanent magnet or variable reluctance motor and associated pulse width modulated inverter which serves not only as a power source, but as a sensor; 3) an electronically modulated check/flow control valve; 4) a condenser with a variable speed fan; 5) a combination filter/dryer/accumulator for cycling when necessary; 6) an electronically actuated expansion valve; and 7) an evaporator with a variable speed fan.

In one aspect, the present invention is directed to a method of controlling a refrigeration system having a working fluid and, in sequence, an evaporator, a variable speed centrifugal compressor, a condenser and an expansion valve. The method comprises the steps of accelerating rotation of the compressor; measuring the acceleration of the compressor; measuring the temperature or pressure of the working fluid at the compressor; determining rate of change of the temperature or pressure of the working fluid during any acceleration of the compressor; decreasing acceleration of the compressor if the rate of change of the temperature or pressure of the working fluid indicates surging of the compressor; and repeating these steps until the compressor stops accelerating. Preferably, initial acceleration of the compressor is to a predetermined maximum level. The temperature and pressure of the working fluid may be measured within or downstream adjacent to the compressor. Since surging of the compressor may occur both during increases and decreases in compressor speed, acceleration control is important in both directions. As such, references herein to increasing or decreasing acceleration are to the absolute value of the acceleration, since positive or negative accelerations may be involved.

In a related aspect, the present invention includes apparatus for controlling a refrigeration system having a working fluid and, in sequence, an evaporator, a variable speed centrifugal compressor, a condenser and an expansion valve. Such apparatus comprises a sensor for measuring the acceleration of the compressor and a sensor for measuring the temperature or pressure of the working fluid at the compressor. A microprocessor control determines rate of change of the temperature or pressure of the working fluid during any acceleration of the compressor and decreases acceleration of the compressor if the rate of change of the temperature or pressure of the working fluid indicates surging of the compressor.

In another aspect, the present invention is directed to a method of controlling a refrigeration system having a working fluid and, in sequence, an evaporator, a variable speed centrifugal compressor, a condenser and an expansion valve. This method comprises the steps of operating the compressor at a constant speed; maintaining the working fluid a first predefined level of superheat between the evaporator and the compressor while the compressor is operating at constant speed; accelerating rotation of the compressor; increasing the superheat of the working fluid between the evaporator and the compressor to a second predefined level above the first predefined level and maintaining the superheat at the second predefined level while the compressor is accelerating; and decreasing the superheat of the working fluid to the first predefined level when the compressor returns to a constant operating speed. Preferably, the expansion valve is adjustable to vary the flow of the working fluid in the system and the superheat of the working fluid is increased during compressor acceleration by adjusting flow of the working fluid through the expansion valve. The evaporator also includes an adjustable fan to vary the rate of heat transfer of the working fluid and the superheat of the working fluid is increased during compressor acceleration by adjusting heat transfer of the working fluid at the evaporator.

In a related aspect, the present invention includes apparatus for controlling a refrigeration system having a working fluid and, in sequence, an evaporator, a variable speed centrifugal compressor, a condenser and an expansion valve which comprises a sensor for determining when the compressor is operating at a constant speed and a microprocessor control for maintaining the working fluid at a first predefined level of superheat between the evaporator and the compressor while the compressor is operating at constant speed. Also provided is a sensor for determining when rotation of the compressor is accelerating and a microprocessor control for increasing the superheat of the working fluid between the evaporator and the compressor to a second predefined level above the first predefined level and maintaining the superheat at the second predefined level while the compressor is accelerating.

In yet another aspect, the present invention includes a method of monitoring a variable speed centrifugal compressor in a refrigeration system having a working fluid. During an initiation period, rotation of the compressor is accelerated while measuring the acceleration of the compressor; measuring power input to the compressor; and measuring rate of change of temperature or pressure of the working fluid at the compressor. These steps are repeated to assemble a plurality of the measurements at different acceleration levels. The acceleration, power input and working fluid rate of change of temperature or pressure measurements during the initiation period are then stored. Subsequent to the initiation period, rotation of the compressor is accelerated while measuring the acceleration of the compressor; measuring power input to the compressor; and measuring rate of change of temperature or pressure of the working fluid at the compressor.

A determination of an indication of deterioration of the compressor is made by comparing the acceleration, power input and working fluid rate of change of temperature or pressure measurements during the subsequent period with the acceleration, power input and working fluid rate of change of temperature or pressure measurements during the initiation period. A signal of deterioration of a drive component of the compressor is made if the power input to the compressor in the subsequent period increases by a predetermined amount over the power input in the initiation period while the acceleration and working fluid rate of change of temperature or pressure measurements remain constant between the periods. A signal of deterioration of a pressurizing component of the compressor is made if the rate of change of temperature or pressure of the working fluid in the subsequent period decreases by a pre-determined amount over the rate of change of temperature of the working fluid in the initiation period while the compressor acceleration remains constant between the periods.

Preferably, the compressor is driven by an electrically powered motor and the power input to the compressor in steps is measured by the level of electric power input to the motor. Following a determination of deterioration of the compressor, the steps are repeated in a new initiation period to determine an indication of deterioration of the compressor in subsequent periods.

In another related aspect, the present invention provides apparatus for monitoring a variable speed centrifugal compressor in a refrigeration system having a working fluid which comprises a sensor for measuring the acceleration of the compressor; a sensor for measuring power input to the compressor; and a sensor for measuring rate of change of temperature or pressure of the working fluid at the compressor. A microprocessor control stores acceleration, power input and working fluid rate of change of temperature or pressure measurements during an initiation period and determines an indication of deterioration of the compressor by comparing acceleration, power input and working fluid rate of change of temperature or pressure measurements during a subsequent period with the acceleration, power input and working fluid rate of change of temperature or pressure measurements during the initiation period.

In a further aspect, the invention includes a method of controlling a refrigeration system having a working fluid and, in sequence, an evaporator, a variable speed centrifugal compressor, a condenser and an expansion valve. The method comprises the steps of accelerating rotation of the compressor during an initiation period while measuring the acceleration of the compressor; and measuring rate of change of temperature or pressure of the working fluid at the compressor. These steps are repeated to assemble a plurality of the measurements at different acceleration levels. The acceleration and working fluid rate of change of temperature or pressure measurements during the initiation period are then stored. Subsequent to the initiation period rotation of the compressor is accelerated while measuring the acceleration of the compressor. The acceleration measurement during the subsequent period are compared with the acceleration and working fluid rate of change of temperature or pressure measurements during the initiation period. If, for a comparable acceleration during the initiation period, the rate of change of the temperature or pressure of the working fluid during the initiation period indicates surging of the compressor, acceleration of the compressor is decreased.

In yet another related aspect, the present invention provides an apparatus for controlling a refrigeration system having a working fluid and, in sequence, an evaporator, a variable speed centrifugal compressor, a condenser and an expansion valve, comprising a sensor for measuring the acceleration of the compressor and a sensor for measuring rate of change of temperature or pressure of the working fluid at the compressor. A microprocessor control stores acceleration and working fluid rate of change of temperature or pressure measurements during an initiation period; compares an acceleration measurement during the subsequent period with the acceleration and working fluid rate of change of temperature or pressure measurements during the initiation period; and decreases acceleration of the compressor if, for a comparable acceleration during the initiation period, the rate of change of the temperature or pressure of the working fluid during the initiation period indicates surging of the compressor.

DESCRIPTION OF THE PREFERRED EMBODIMENT

The air conditioning/refrigeration control system of the present invention is designed to combine the advantages of single operating point high compressor efficiency, the advantages of variable speed operation for high- to mid-point load demand, and the advantages of system cycling for higher overall system efficiency for far off-design point, low load operation. This variable cycle operation is achieved through a unique system operation control approach.

Figure 1:
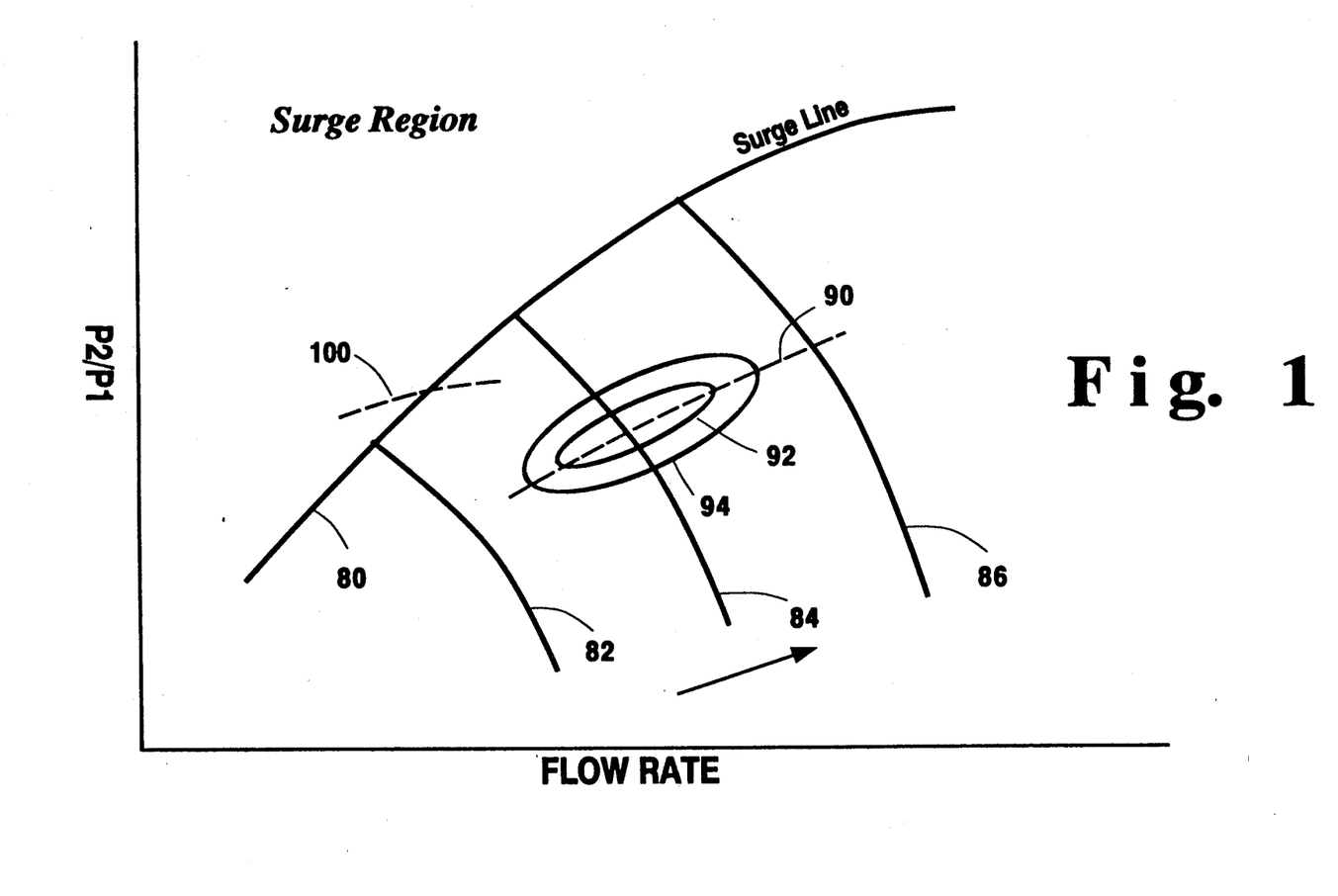
FIG. 1 is a plot of the typical operating characteristics of a compressor employed with the preferred embodiment of the present invention which is useful in understanding the control parameters of an air conditioning/refrigeration system.

Typical operating characteristics of a compressor are shown in FIG. 1 which depicts the compressor pressure ratio, i.e., compressor outlet pressure to compressor inlet pressure (P1/P2) on the ordinate, and the refrigerant flow rate on the abcissa. Shown graphically is the so-called "surge line" 80, i.e., the line for any specific compressor which separates the safe region of operation, below and to the right of the line, from the unstable region of operation i.e., above and to the left of the surge line. The surge line represents the limit of stable operation for maximum compressor pressure ratio at any given flow. Also imposed on this curve is a steady state operating line set by design to be on the maximum efficiency characteristics. The surge characteristics vary for different compressors and may be determined for a particular compressor by well known testing methods. Below the surge line 80, lines 82, 84 and 86 depict lines of constant compressor speed, N1, which increase in the direction shown by the arrow.

A normal operating line for steady state loading of the compressor 12 is shown by dotted line 90. Superimposed over the steady state load line are lines 92, 94 forming "islands" of constant compressor efficiency, which increase in the direction shown by the arrow. In prior art air conditioning/refrigeration systems, the normal compressor load line 90 has been positioned at what has been determined by testing to be a safe distance from surge line 80. The reason for maintaining a predetermined distance from surge line 80 is that, during change of speed (acceleration) of a compressor, the transient compressor load line depicted by dashed line 100 may shift the operation of the compressor into the unstable surge region above surge line 80. In the present invention, acceleration measurement and control is provided when the compressor is increasing in speed as well as decreasing in speed, since compressor surging problems may occur in both directions. Compressors, although quite efficient if designed and matched to other system components properly, tend to have difficulty under certain conditions in going from stop to full load operation, and back to stop. The problem is one in that the flow lags behind the pressure ratio and the transient acceleration load line can cross into the surge region of unstable operation (often nonrecoverable) with failure of performance and attendant risk of component damage. Typical practice in the past has been to program into the control system an artificial limit to ensure that the compressor speed never approaches the surge line under any combination of load, ambient, and component hardware conditions. While this system works quite well in practice, the programmed margin between the operating conditions and the surge line limits achievement of maximum cycle efficiency.

In order to avoid transient operation in the unstable surge region and damage to the compressor, the control system of the present invention provides, in one aspect, means for monitoring the acceleration of the compressor and the parameters of the refrigerant, and controlling the compressor acceleration if the rate of change of the monitored condition of the refrigerant indicates surging of the compressor. The information of the type shown in FIG. 1 may be stored as a look-up table in the memory of a conventional microprocessor control to determine incipient surging. However, the present invention provides a system and method which is able to avoid reliance on such tables in controlling the air conditioning/refrigeration system and places no pre-programmed limits between compressor operating conditions and surge limits.

As described herein, it has been found that a superior method of system control as the transient load line approaches the surge line is to monitor rate of change of compressor speed, or the acceleration of the compressor rotor, and the rate of change of refrigerant temperature and/or pressure rise at the compressor. By measurement of the rate of change of compressor speed (dn/dt) and controlling input power to a safe and stable level, the most rapid, surge free, and efficient transients are permitted. Furthermore, through implementation of an appropriate incipient surge detection device, such as a rapid response temperature and pressure sensors, and the appropriate control logic, this acceleration schedule can be altered automatically to accommodate unanticipated load, ambient, thermodynamic, or mechanical conditions. Prior art systems, such as the one described in U.S. Pat. No. 5,065,590, require complex bypass schemes and surge control valves which are obviated by this system.

Figure 2:
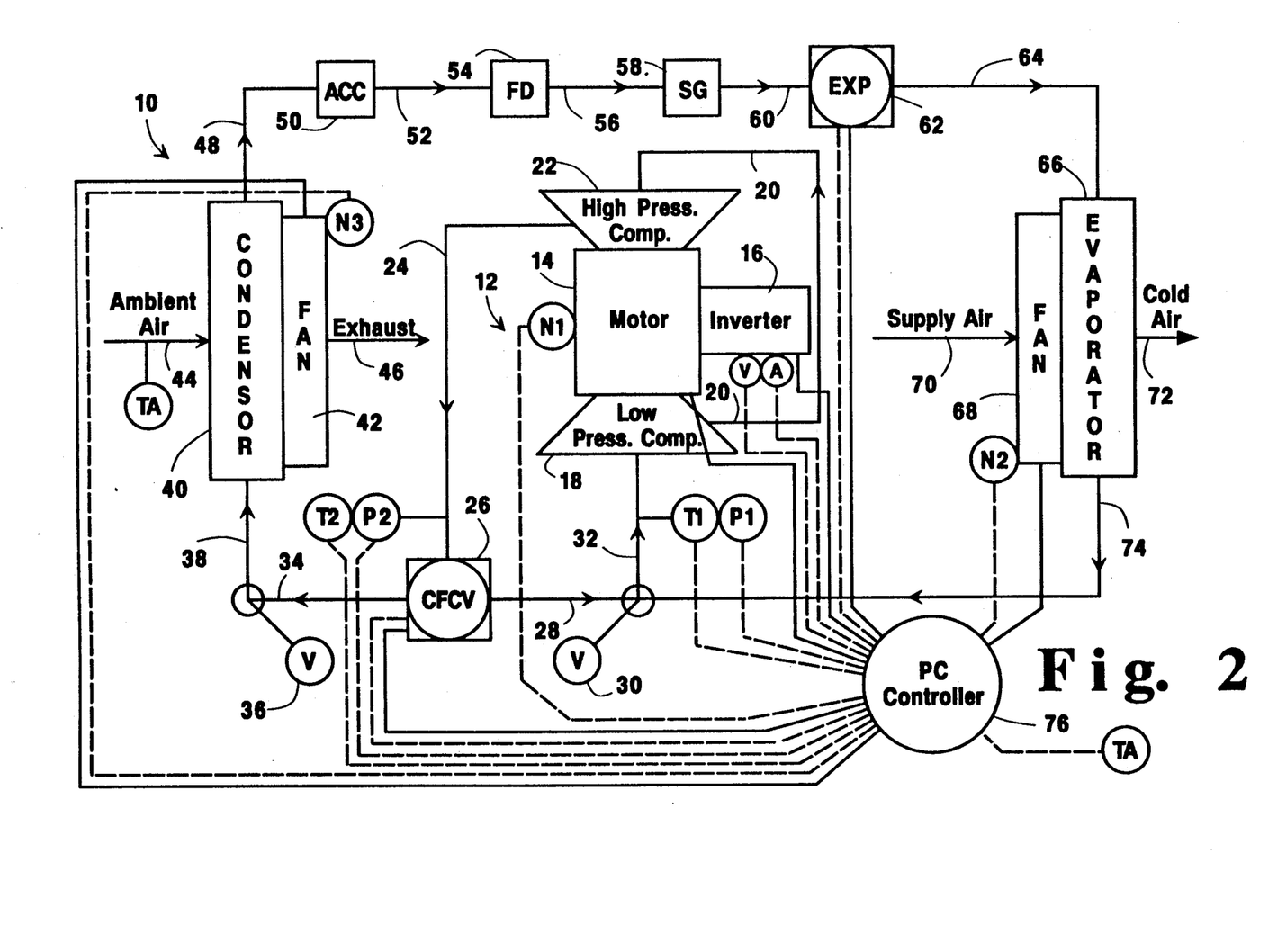
FIG. 2 is a block diagram of a preferred embodiment of the air conditioning/refrigeration control system of the present invention.

The preferred embodiment of the control system is described with respect to an air conditioning/refrigeration system 10 depicted in FIG. 2. A variable speed compressor 12 comprises an induction motor 14 having a double ended shaft which is coupled to a low pressure centrifugal type compressor 18 on one end, and high pressure centrifugal type compressor 22 on the opposite end. Gaseous phase working fluid or refrigerant is delivered to the low pressure compressor by line 32. Readily available, fast reacting temperature and pressure sensors are provided to measure inlet temperature T1 and inlet pressure P1 absolutely and as a function of time (DT1/DT and DP1/DT, respectively). Line 20 then delivers the refrigerant from low pressure compressor 18 to high pressure compressor 22. A two stage centrifugal compressor of the type disclosed in U.S. Pat. No. 5,065,590 may be employed, the disclosure of which is hereby incorporated by reference. Depending on the design parameters of the system, which will be readily apparent to one of ordinary skill in the art, any other type of compressor may be substituted in place of this two stage compressor, such as a one stage centrifugal compressor or a dual stage, combined axial/centrifugal compressor. For smaller applications in the 25,000-50,000 Btu/hr range, a two stage centrifugal compressor may typically have a pressure ratio DP2/DP1 range of 8-15 and may operate at speeds in excess of 100,000 rpm.

Conventional speed sensors are provided to measure the rotational speed N1 and acceleration DN1/DT of the compressor shaft. A conventional inverter 16 is provided to supply pulsed output to the variable speed motor 14. The frequency of the inverter output is regulated by timing signals supplied from its logic circuit. Voltage V and current A to the inverter are measured by conventional voltage and current sensors. The particular manner in which the rate of change of rotation of the compressor is controlled is one important aspect of the present invention which will be further explained in more detail.

High pressure compressor 22 is connected via refrigerant line 24 to a variable check/flow control valve 26. Again, fast reacting temperature and pressure sensors are provided to measure condenser outlet temperature T2 and outlet pressure P2, respectively, absolutely and as a function of time (DT2/DT and DP2/DT, respectively). The variable check/flow control valve should have a relatively low pressure drop when utilizing relatively low pressure, environmentally friendly refrigerants. Depending on the setting of valve 26, refrigerant is either passed through line 28 and through a low pressure service valve 30 for return to low pressure compressor 18 via line 32 to achieve proper flow balance, or out through line 34 through high pressure service valve 36 and line 38 to condenser 40, or modulated to both. As the refrigerant passes through condenser 40, variable speed condenser fan 42 (including conventional means for measuring fan speed N3) draws ambient air 44 at temperature TA through the condenser to cool and liquefy the refrigerant and exhausts the warmed ambient air 46 back to the environment.

The now liquid phase refrigerant passes through line 48 to a conventional accumulator 50, through line 52 to a conventional refrigerant filter/dryer 54, through line 56 to a conventional sight glass 58, and finally through line 60 to a variable expansion valve 62. A function of the expansion valve 62 is to control the refrigerant flow rate to maintain a desired superheat in the refrigerant when it exits the evaporator in a gaseous state. The present invention controls the degree of superheat in a particular manner which will be described further below. As the refrigerant passes through line 64 to evaporator 66, a variable speed evaporator fan 68 (including conventional means for measuring fan speed N2) draws supply air 70 either from the outside environment or from the interior of the area to be cooled. After passing through evaporator 66, cold air 72 is exhausted to the area to be cooled. The now gaseous refrigerant then passes through line 74 and low pressure service valve 30 and line 32 back to compressor 12. A PC-based microprocessor controller 76 receives input (dotted lines) from all of the various sensors measuring the aforementioned system parameters and sends output (solid lines) to the various devices in accordance with a pre-programmed algorithm as discussed below.

Figure 3:
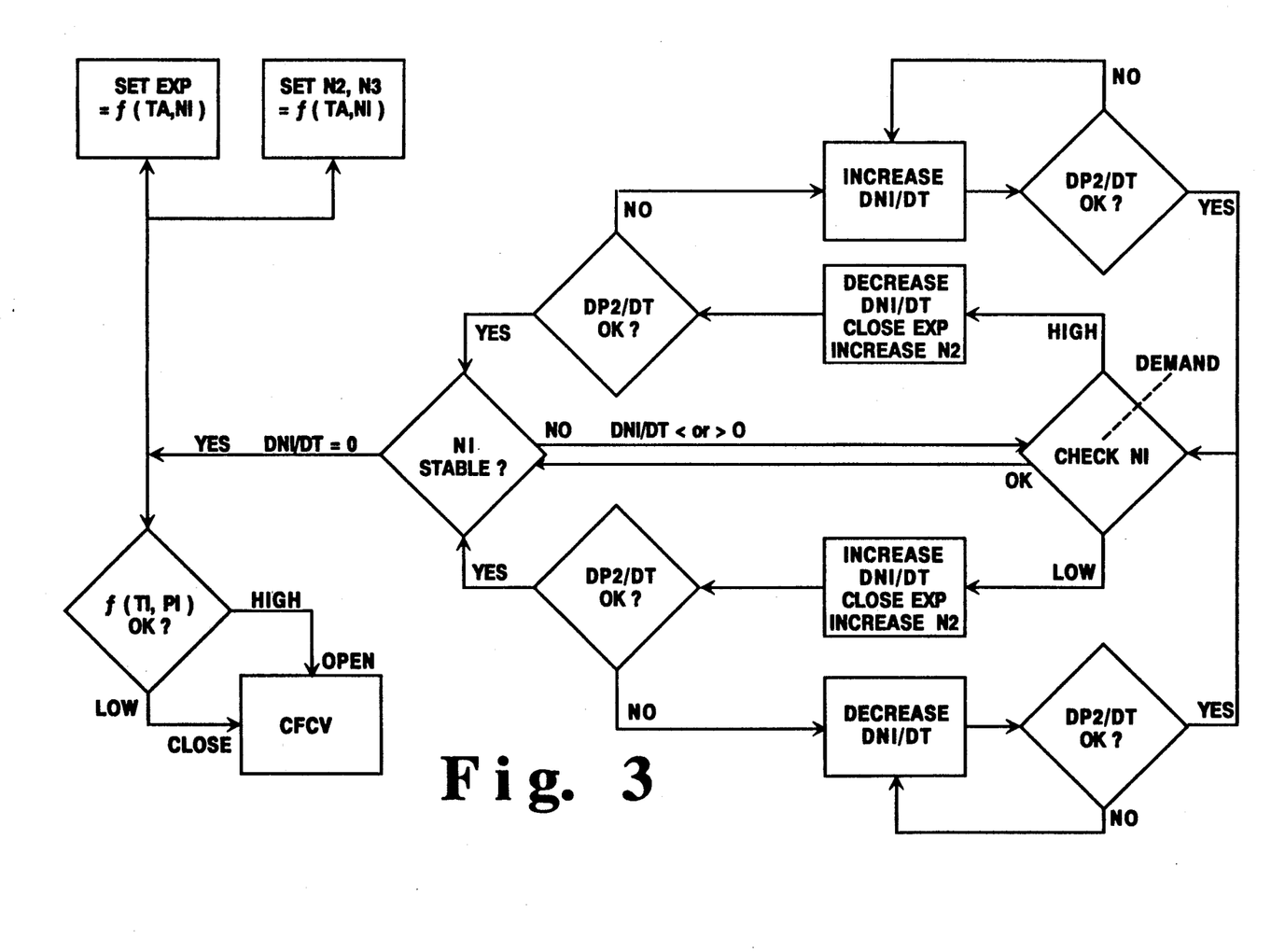
FIG. 3 depicts the logic diagram of one aspect of the control system of the present invention.

The logic diagram for one aspect of the preferred embodiment of the control system of the present invention is depicted in FIG. 3. This logic system is used during operation to maintain the variable speed compressor in the safe region below the surge line (see FIG. 2). The control system also provides a method for varying superheat of the refrigerant exiting the evaporator to increase operating efficiency. The system control variables are shown below in Table 1 and are measured at the positions indicated in FIG. 1.

TABLE 1

System Control Variables:

T1: Compressor inlet temperature

T2: Compressor outlet temperature
TA: Condenser air side inlet temperature
P1: Compressor inlet pressure
P2: Compressor outlet pressure
N1: Compressor motor speed
N2: Evaporator fan speed
N3: Condenser fan speed
CFCV: Check/flow control valve position
EXP: Expansion valve position
V: Pulse width modulated voltage
A: Motor current The logic system depicted in FIG. 3 may be programmed as a software algorithm into a conventional microprocessor which may utilize any one of a number of input/output communications protocols used in industry, such as the RS 232 standard serial communication protocol utilized in IBM compatible systems.

As shown in FIG. 3, a demand is initially signalled by a thermostat or similar device to increase or decrease the cooling output of the system. At that time, the microprocessor control checks the compressor motor speed N1 to determine if it is operating at the desired speed. The desired speed is predetermined by the particular operating characteristics of the air conditioning/refrigeration system and may be stored on a look-up table in memory.

If the compressor speed N1 is too low, the acceleration schedule of rotation of the compressor DN1/DT is increased to a first rate predetermined by the operating characteristics of the compressor. At the same time, the expansion valve setting EXP is adjusted to close and evaporator fan speed N2 is increased to raise the superheat of the refrigerant exiting the evaporator, the operation of which will be explained in further detail below. The rate of change of refrigerant pressure at the compressor outlet DP2/DT is measured and checked to determine if it is within a desired range which indicates that the compressor is still operating in the stable region below the surge line. The particular safe range of DP2/DT is determined according to the individual characteristics of the compressor utilized and is stored in the microprocessor memory. For example, a pressure rise of 400 psi/sec. may be determined to be within the stable operating region below the surge line while a pressure rise of 2000 psi/sec. may be determined to indicate imminent surging. In such case, the safe range of DP2/DT may be set at, say, 800 psi/sec., and any value over that would be considered undesirable.

As an alternative to using the rate of change of outlet pressure P2 to determine surging, the rate of change of outlet temperature T2 may be employed. It has been found that for anticipation of mild surging, the rate of change of temperature DT2/DT is a satisfactory indicator. However, for anticipating major surging, pressure instability has been found to manifest itself better and the rate of change of pressure DP2/DT is more preferably employed as an indicator.

If the value of DP2/DN1 (or DT2/DN1) is within a satisfactory range, the system checks to see if N1 is stable, i.e., is it operating at a constant speed or is it accelerating. If, on the other hand, DP2/DN1 (or DT2/DN1) is not within acceptable range, for example, it has an excessively high value indicating that the compressor is heading into the region of instability above the surge line, then the acceleration schedule is decreased, i.e., DN1/DT is decreased, and DP2/DT (or DT2/DN1) is again checked to see if it is within the acceptable, non-surging range. If DP2/DT or DT2/DN1 is again too high, the acceleration schedule is decreased until it is within the acceptable range. Once this occurs, the system again checks to see if N1 is too high or low for the demand input.

If compressor speed N1 is too high, then a negative acceleration schedule is instituted by establishing a first, predetermined rate of −DN1/DT to slow the compressor down. It has been found that problems with surging may occur even during excessive rates of slowing the compressor. At the same time, the expansion valve setting EXP is adjusted to close and evaporator fan speed N2 is increased to raise the superheat of the refrigerant exiting the evaporator. DP2/DT or DT2/DT is checked to see if it is within the safe, non-surging range. If it is, the system goes on to check if compressor speed N1 is stable. If DP2/DT or DT2/DT is too high, a DN1/DT is increased (since DN1/DT is negative, this leads to a lower absolute value of acceleration) until DP2/DT or DT2/DT is within the safe range. Then the system again checks to see if N1 is too high or low for the demand input.

Once compressor speed N1 is stable at the desired level for demand, i.e., DN1/DT=0, the expansion valve setting EXP and the speeds of the evaporator fan N2 and condenser fan N3 are set (or reset in the case of EXP and N2) as a function of ambient temperature TA and compressor speed N1 according to the operating characteristics of the entire system. Simultaneously, compressor inlet temperature T1 and compressor inlet pressure P1 are checked to determine whether flow through the check/flow control valve should be adjusted. The valve position CFCV is either opened to permit greater flow or closed to restrict flow until the proper setting is achieved. If the demand input on the system is so low that the compressor must operate at an inefficient speed, CFCV closes completely, the compressor shuts down and the accumulator continues to supply refrigerant to the evaporator, enabling the system to cycle off during periods of low demand. Thus, the air conditioning/ refrigerant control system described herein has the ability to operate efficiently through normal demand conditions by varying the speed of the compressor, and more importantly, controlling compressor acceleration as it increases and decreases speeds. The monitoring of rate of change of refrigerant pressure or temperature at the compressor enables the microprocessor to control the compressor at operating conditions near the surge line without actually entering the surge region for any length of time which would lead to breakdown. At extremely low cooling loads, the compressor cycles off through use of a low pressure drop check/flow control valve. This valve closes only when system demand drops below the level which would indicate unacceptable thermodynamic performance of the compressor.

The self-programming acceleration capability of the control system provides considerable benefits. For example, significantly different refrigerants can be used with the same compressor and control hardware to achieve quite different load characteristics without the need to alter or reprogram the system. For example, a baseline system designed to accommodate a CFC refrigerant, such as R113, can be switched to its HFC replacement, such as HFC43-10, which has somewhat different thermodynamic characteristics, without operational impact, or can be switched to FC123, for example, to achieve more than double the compressor capacity without impact on the control or the compressor. Thus various applications which have heretofore been thought to be conflicting can be addressed with the same fundamental hardware and software. This is of significant benefit in applying given compressors to disparate evaporator temperature requirements which typically would require both control and hardware changes.

An other feature of this air conditioning/refrigeration control system is the manner in which refrigerant superheat is dealt with. The control system of the present invention provides a method for controlling and varying superheat of the refrigerant exiting the evaporator to increase operating efficiency. Past practice has been to rely on a predetermined fixed degree of superheat exiting the evaporator, maintained by a plurality of control schemes, to ensure that no liquid enters the compressor under any variation in load, hardware, or ambient conditions. It has been found that maintenance of a fixed degree of superheat is inefficient under most operating conditions since more superheat is provided than is required for safe operation, thus negatively impacting the cycle efficiency.

Unlike prior art systems, in the control system of the present invention, the superheat may be maintained by control of the setting of the expansion valve at a relatively low level, e.g., 2°-5° C., only during periods of constant compressor speed, i.e., when DN1/DT=0. However, while the compressor is accelerating (either while increasing or decreasing speed), the superheat of the refrigerant is increased to a higher predefined level, above the normal steady state level. In other words, when the system detects that DN1/DT is greater than or less than 0, the expansion valve is closed to increase the level of superheat above the normal steady state level, for example to 10°-15° C. Once the compressor returns to a constant operating speed, i.e. DN1/DT=0, then the expansion valve EXP is opened to decrease the superheat to its lower, predefined, steady state level. The desired level of superheat can be readily determined for an individual system without undo experimentation. In addition to using the expansion valve position EXP to determine the degree of superheat, or as an alternative thereto, the speed of the evaporator fan N2 may be increased during compressor acceleration, and then decreased again when the compressor returns to a constant operating speed and DN1/DT=0.

Implementation of such acceleration dependent operational control, coupled with the aforedescribed control based on surge detection, permits a more efficient mode of operation. During steady state operation the system operates with only a minimum of superheat with significantly enhanced efficiency. With the on set of transient operation, appropriate accommodations take place, in including modification of compressor pressure ratio, expansion valve setting, and evaporator fan speed to increase the superheat margin.

The present invention also may be employed to monitor the condition of the compressor as a function of time, to signal a particular defect or deterioration of the compressor, e.g., mechanical or aerodynamic, and to permit stable operation of the system until corrective action can be taken. In this regard, an initiation period is set during which time the rotation of the compressor is accelerated and the acceleration is measured. At the same time, there is measured the power input to the compressor at the inverter (V×A) and the rate of change of temperature and/or pressure of the refrigerant at the compressor outlet (DT2/DT and/or DP2/DT, respectively). Preferably, a plurality of such measurements are taken at various acceleration levels. These acceleration, power input and refrigerant rate of change of temperature or pressure measurements are then stored, for example in resident memory of a microprocessor based control system. At any time subsequent to the initiation period, measurements of power input to the compressor and rate of change of temperature or pressure of the refrigerant at the compressor outlet while accelerating rotation of the compressor. These measurements of acceleration, power input and refrigerant rate of change of temperature or pressure during a desired subsequent period are compared with the comparable measurements during the initiation period. If the power input to the compressor in the subsequent period increases by some significant, predetermined amount, e.g. 5–10%, over the power input in the initiation period while the acceleration and working fluid rate of change of temperature measurements remain constant between the periods, this indicates deterioration of a mechanical drive component of the compressor, for example, a worn bearing or bushing. At this point, an appropriate signal of this mechanical deterioration may be made by the system to alert the operator.

If, on the other hand, the rate of change of temperature or pressure of the refrigerant in the subsequent period decreases by a significant, predetermined amount, e.g. 5–10%, over the rate of change of temperature of the working fluid in the initiation period while the compressor acceleration remains constant between the periods, this indicates deterioration of an aerodynamic, pressurizing component of the compressor, for example, the compressor blades. This condition may then be signalled by the control system to the operator. If there is no significant change of comparable measured parameters between the initiation and subsequent periods, this may also be indicated. Should any indication of compressor deterioration be given, the system may then be re-initialized so that further deterioration may be signalled to the operator.

The self-compensating capability of this control system provides for system reliability and operational effectiveness in that, not only is there a self-diagnostic capability to indicate an incipient problem, but also, through automatic re- initialization of the acceleration schedule, the system will permit stable operation in the degraded state until corrective action can be taken. Through appropriate incorporation of the aforedescribed sensors, the comparison of input power versus initial and "as is" demand acceleration serves to diagnose such malfunctions as compressor rub, efficiency loss through degradation, labyrinth seal drag, and the like.

The aforementioned system of measuring and storing a system parameters during an initiation period may also be used to control the air conditioning/refrigeration system. During periods subsequent to the initiation period, the compressor may be accelerated during normal operation while comparing the actual acceleration with the acceleration and working fluid rate of change of temperature or pressure measurements during the initiation period as stored in memory. If, for a comparable acceleration during the initiation period, the rate of change of the temperature or pressure of the refrigerant during the initiation period indicates surging of the compressor, the acceleration of the compressor may be decreased in anticipation of surging conditions.

While this invention has been described with reference to specific embodiments, it will be recognized by those skilled in the art that variations are possible without departing from the spirit and scope of the invention, and that it is intended to cover all changes and modifications of the invention disclosed herein for the purposes of illustration which do not constitute departure from the spirit and scope of the invention.

Having thus described the invention, what is claimed is:

1. A method of controlling a refrigeration system having a working fluid and, in sequence, an evaporator, a variable speed centrifugal compressor, a condenser and an expansion valve, comprising:
   a) operating said compressor at a constant speed;
   b) maintaining said working fluid a first predefined level of superheat between said evaporator and said compressor while said compressor is operating at constant speed;
   c) accelerating rotation of said compressor;
   d) increasing the superheat of said working fluid between said evaporator and said compressor to a second predefined level above said first predefined level and maintaining the superheat at said second predefined level while said compressor is accelerating; and
   e) decreasing the superheat of said working fluid to said first predefined level when said compressor returns to a constant operating speed.

2. The method of claim 1 wherein said expansion valve is adjustable to vary the flow of said working fluid in the system and wherein the superheat of said working fluid is increased in step (d) by adjusting flow of said working fluid through said expansion valve.

3. The method of claim 1 wherein said evaporator includes a variable speed fan to vary the rate of heat transfer of said working fluid and wherein the superheat of said working fluid is increased in step (d) by adjusting heat transfer of said working fluid at said evaporator.

4. Apparatus for controlling a refrigeration system having a working fluid and, in sequence, an evaporator, a variable speed centrifugal compressor, a condenser and an expansion valve, comprising:
   a sensor for determining when said compressor is operating at a constant speed;
   a microprocessor control for maintaining said working fluid at a first predefined level of superheat between said evaporator and said compressor while said compressor is operating at constant speed;
   a sensor for determining when rotation of said compressor is accelerating; and
   a microprocessor control for increasing the superheat of said working fluid between said evaporator and said compressor to a second predefined level above said first predefined level and maintaining the superheat at said second predefined level while said compressor is accelerating.

* * * * *